Figure 1:
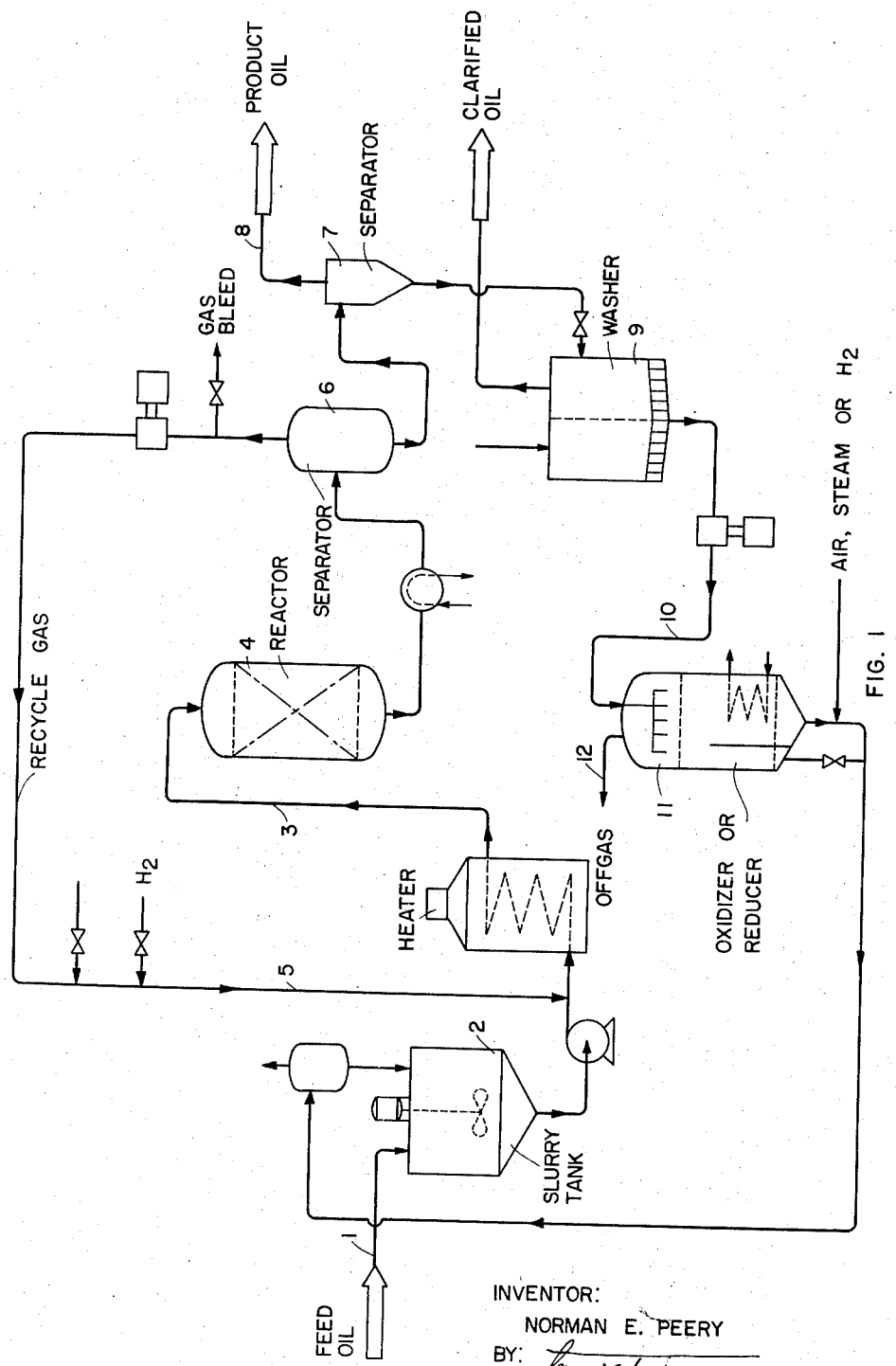

Aug. 25, 1959   N. E. PEERY   2,901,422
HYDRODESULFURIZATION OF HYDROCARBON OILS
Filed Nov. 16, 1956

INVENTOR:
NORMAN E. PEERY
BY: James Todorovic
HIS ATTORNEY

United States Patent Office 2,901,422
Patented Aug. 25, 1959

2,901,422

HYDRODESULFURIZATION OF HYDROCARBON OILS

Norman E. Peery, San Francisco, Calif., assignor to Shell Development Company, New York, N.Y., a corporation of Delaware Application November 16, 1956, Serial No. 622,575

5 Claims. (Cl. 208—213)

This invention relates to the liquid phase hydrodesulfurization of sulfur containing hydrocarbon oils of whatever nature. More specifically, it relates to a hydrodesulfurization process providing improved heat economy and process advantages.

Nearly all hydrocarbon oils ranging from light distillates of the nature of gasoline and light naphthas up to heavy gas oils contain small to appreciable quantities of sulfur compounds and this is especially the case with oils derived from petroleum, oil shales and tar sands. It is desirable to remove the sulfur from such materials and this is done in the few cases where the operation is economically feasible.

The desulfurization of such oils is effected, or may be effected, in any one of three ways, to wit: (1) the hydrocarbon material is treated with hydrogen and a catalyst having hydrogenation activity to convert the sulfur in the sulfur-containing compounds to hydrogen sulfide. Examples of this are the desulfurization of various distillate oils by so-called hydrodesulfurization with molybdena-alumina catalyst, tungsten-nickel sulfide catalyst, cobalt-molybdena catalyst; (2) treatment of the oil with a material which decomposes only the more labile sulfur compounds to liberate hydrogen sulfide. Examples of this are the treatment of oils (mostly straight-run oils) with bauxite or certain clays which have the property of decomposing such sulfur compounds as mercaptans, alkyl sulfides, and alkyl disulfides to liberate hydrogen sulfide without any appreciable effect on the more resistant sulfur compounds of the thiophene type; (3) treatment of the oil with an agent which decomposes the more labile sulfur-containing compounds as in (2) above and then binds the liberated sulfur in the form of a metal sulfide in the catalyst. Examples of this are the desulfurization of oils by treatment with certain metals or sulfur replaceable compounds of iron, copper, molybdenum, cobalt, nickel, etc. Such desulfurization processes are generally less efficient than the first type mentioned above, but have the advantage that the product is substantially free of liberated hydrogen sulfide.

Some of the agents used in these desulfurization processes may be applied in processes of either the first or the third type. However, the methods of operation are distinctly different. For example, a cobalt-molybdena-alumina catalyst may be used in the presence of hydrogen in which case the sulfur compounds of the labile as well as the refractory type are largely decomposed with the liberation of hydrogen sulfide. If the process period before regeneration is very short, the liberated hydrogen sulfide is largely taken up in the catalyst and retained therein in which case a product substantially free of hydrogen sulfide is obtained. If the process period is extended, the sulfur compounds continue to be decomposed but the liberated sulfur is found in the product in the form of hydrogen sulfide and must be subsequently removed. This is disadvantageous since, in most cases, it involves cooling of the product and subsequent reheating.

Thus, while processes are known by which the sulfur compounds in an oil may be continuously converted to a more separable form ($H_2S$), and also processes are known by which a substantially hydrogen sulfide-free product may be obtained intermittently with very frequent regeneration of a sulfur absorbing agent, there is not known, as far as I am aware, any process by which a substantially desulfurized product free of hydrogen sulfide may be continuously obtained. I have invented such a process.

The process will be described with reference to the accompanying drawing the sole figure of which is a flow diagram which illustrates a preferred operation.

In the process of the invention, a finely divided metal or metal compound capable of reacting with hydrogen sulfide under hydrogenation conditions is suspended in the oil to be desulfurized in an amount at least stoichiometrically equivalent to the sulfur in the oil. Hydrogen is then added and the mixture is passed down through a foraminous bed of a sulfactive hydrogenation catalyst under hydrogenation conditions, and the suspended finely divided solid containing sulfur is removed from the liquid effluent of the foraminous bed. In a particular embodiment of the invention, a finely divided alkali metal hydride is used as the metal compound capable of reacting with hydrogen sulfide.

Referring to the drawing, the oil to be processed, and which may be a light distillate of the nature of gasoline or light naphtha or may be a heavy oil such as heavy gas oil or reduced crude petroleum, is introduced by line 1 and passed to a mixing vessel 2 wherein it is slurried with a finely divided metal or compound thereof which is capable of absorbing or reacting with hydrogen sulfide to form the corresponding metal sulfide. Examples of suitable materials are precipitated iron hydroxide, copper, copper oxide, iron, certain clays, cobalt, cobalt hydroxide, nickel, nickel hydroxide, and molybdenum oxide. It may be a pure compound as, for example, finely divided copper, or it may be applied as a thin coating on an inert material. For example, bentonite, fuller's earth, magnesium carbonate or other very finely divided material may be impregnated with a solution of copper nitrate and then heated in air to convert the copper nitrate to copper oxide.

A second group of effective agents consists of hydrides of the alkali metals and the alkaline earth metals.

The amount of the material incorporated in the oil is preferably at least stoichiometric to the expected hydrogen sulfide to be liberated, and more preferably at least stoichiometrically equivalent to the sulfur contained in the oil. The sulfur combining component is preferably in a finely divided state as, for instance, a powder passing a 100 mesh sieve, but it may be even finer, e.g. passing a 300 mesh sieve or even be of colloidal dimensions.

The slurry is then mixed with hydrogen from line 5, preheated, and passed by line 3 to a reactor 4 which is provided with a hydrogenation catalyst such as cobalt-molybdena-alumina, tungsten sulfide-nickel sulfide, molybdena-alumina, molybenum sulfide-alumina, or the like, capable of hydrogenating sulfur compounds to liberate hydrogen sulfide while at the same time being sulfactive, i.e., capable of catalyzing hydrogenation in the presence of sulfur. This catalyst, contrary to the first agent, is employed as a fixed bed of particles of relatively large size, e.g., 1/8 to 3/8 inch pieces. The gas containing appreciable concentration of hydrogen, e.g., at least 50%, introduced into the slurry by line 5 is added in an amount at least sufficient to convert all of the sulfur present to hydrogen sulfide and preferably in an amount equivalent to several hundred standard cubic feet per barrel of oil, e.g., 500–4000 s.c.f./bbl. The temperature in the reactor 4 is maintained between about 300° C. and about 475° C., and the pressure is maintained sufficient to maintain the oil either substantially completely in the vapor phase or at least 60% in the liquid phase. The pressure, depending upon the boiling range of the oil and the desired operating phase, may vary from about 1 atmosphere to over 100 atmospheres.

The mixture of gas and slurry, after passing downward through the bed of catalyst in reactor 4, is withdrawn near the bottom. In the case where the oil is maintained in reactor 4 at least 60% in the liquid phase, the effluent from the reactor is cooled and passed to a gas separator 6. The gas is recycled by line 5 and the liquid containing the solid in suspension is passed to a separator 7 which may be a liquid cyclone (e.g., a so-called hydroclone), as illustrated, or it may be a filter, thickener, settling tank, or centrifuge. The clear desulfurized oil is then passed by line 8 to storage or subsequent use.

The finely divided solid separated from the bulk of the oil by the cyclone 7 is recovered as a thickened slurry. This may be passed to a washer 9 to separate further amounts of oil. The solid is then passed by line 10 to an oxidizing or reducing converter 11 wherein it is reconverted to its original state with the liberation of $SO_2$ or $H_2S$, which is removed by line 12. The solid may then be recycled and used in the process. In some cases where solid is inexpensive, the solid removed in the separator 7 may be discarded either before or after recovering the sulfur values.

When operating with the oil in the vapor phase in reactor 4, the effluent vapors are first passed without prior cooling through one or more cyclone separators (not shown) to recover the solids. The solids may be passed directly to the oxidizing or reducing converter or discarded and the vapors are then cooled to condense the liquid desulfurized oil and separate it from the gas which may be recycled.

In some cases where the solid is oxidized for re-use, part of the sulfur is converted to sulfate. In this case it is desirable to leach the used solid with water to dissolve out the metal sulfate and to precipitate the fresh metal hydroxide from the solution by the use of an appropriate alkali.

In case the suspended material is one of the above-mentioned second group comprising the described hydrides, the separated material is more difficult to reconvert to a useable form and is therefore generally discarded, if desired, after recovering the sulfur. Thus, for example, the removed materials may be reacted with steam to liberate hydrogen sulfide which can be separately collected.

The simultaneous use of the two separate materials in the manner indicated allows a greater removal of sulfur from the oil being treated. This is due to reaction of part of the sulfur with the suspended material and also to a shift in the desulfurization equilibrium thereby making the fixed catalyst more effective. Thus, when using the fixed hydrogenation catalyst alone, the liberated hydrogen sulfide tends to repress further desulfurization. In fact, high partial pressures of hydrogen sulfide in the reaction mixture limit the extent of desulfurization which is possible regardless of the residence time in the reaction zone. By removing at least part of this liberated hydrogen sulfide by combination with the suspended solid, the desired desulfurization is favored. It is also found that when treating many oils using only the fixed hydrogenation catalyst the catalyst loses its activity in a relatively short time. Generally, a process period of not more than about 20 hours is possible when treating reduced crude petroleum. The finely divided and suspended sulfur-getter used in the present process apparently deactivates or absorbs most of the catalyst poisons and consequently they are no longer in a position to deactivate the fixed catalyst.

In some cases where the oil rate is low and the suspended matter is relatively coarse, it is found that the fixed bed of catalyst gradually becomes clogged with the finely divided material which builds up in the catalyst bed. While this is inconvenient when it occurs, the difficulty can be avoided by back washing the fixed bed whenever the pressure drop through the bed indicates incipient plugging. Treated oil is the preferred material for the back wash; however, other liquids including water, when the temperature is sufficiently low, can be used. While it is not essential it is advantageous to inject a stream of hydrogen into the bottom of the reactor along with the wash liquid. This provides sufficient agitation that it is usually unnecessary to jiggle the catalyst bed.

The process of the invention is not only useful for the hydrodesulfurization of hydrocarbon oils but it is also useful when it is desired to hydrogenate oils much more deeply. Thus, for instance, it is frequently desired to hydrogenate oils containing appreciable concentration of aromatic hydrocarbons to such an extent that the aromatic hydrocarbons are also largely hydrogenated. When the oil contains appreciable amounts of sulfur compounds, as is frequently the case, it is found that a substantial portion of the hydrogen used is consumed in hydrogenating the sulfur compounds before hydrogenation of the aromatic hydrocarbons begins. For example, when the total uptake of hydrogen is 600 s.c.f./bbl. of oil, 200 s.c.f. of this may be utilized only in hydrogenating sulfur compounds. In the present process, by using a sufficient amount of suspended metal, practically all of the hydrogen may be consumed in the desired hydrogenation of the aromatic hydrocarbons while at the same time still obtaining a desulfurized product. This is believed due to regeneration of hydrogen according to the equation $$metal + H_2S \rightarrow metal\ sulfide + H_2$$

In the above, the process has been described in a preferred embodiment in which the finely divided agent is suspended in all of the feed and the suspension is trickled downward through a foraminous bed of the large catalyst particles under hydrogenation conditions. It will be appreciated that the finely divided material may be suspended in only a fraction or portion of the oil and this may be passed through the catalyst bed along with the main body of the oil.

*Example*

Luxmass (mostly ferric hydroxide) obtained as a by-product from bauxite in the recovery of alumina as sodium aluminate is finely ground and then screened to reject all material retained on a standard 300 mesh sieve. This material is added in various amounts up to 62 grams per liter to a Mexican gas oil having the following inspection data and thoroughly agitated to form homogenous suspensions:

| | |
|---|---|
| d 20/4 | 0.901 |
| Sulfur, percent wt. | 3.10 |
| Acid value, mg. KOH/g. | 3.2 |
| Ash, percent wt. | 0.001 |
| Diesel index | 29 |

ASTM distillation:

| | |
|---|---|
| I.B.P.—° C. | 248 |
| 10% vol.—° C. | 267 |
| 20% vol.—° C. | 274 |
| 30% vol.—° C. | 279 |
| 40% vol.—° C. | 286 |
| 50% vol.—° C. | 293 |
| 60% vol.—° C. | 301 |
| 70% vol.—° C. | 311 |
| 80% vol.—° C. | 325 |
| 90% vol.—° C. | 343 |
| 95% vol.—° C. | 354 |
| F.B.P.—° C. | --- |

Elementary analysis:

| | |
|---|---|
| C—percent wt. | 84.86 |
| H—percent wt. | 11.98 |
| S—percent wt. | 3.10 |
| O—percent wt. | 0.04 |
| N—percent wt. | 0.02 |

Each suspension is passed along with hydrogen through a heated coil of such dimensions that the flow is turbulent, wherein it is heated to a temperature of 375° C. The suspension, along with the hydrogen, is then passed downward through a fixed bed of 8 x 8 mm. catalyst pellets consisting of 0.8% Co and 6.5% Mo as sulfides deposited in an activated Surinam bauxite carrier. The throughput rate is 5.06 kg./l./hr.; the temperature and pressure are 375° C. and 50 atm., respectively. The amount of hydrogen supplied is adjusted such that the exit gas amounts to 49 standard cubic meters of hydrogen per metric ton of product. The product issuing from the bottom of the reactor is cooled, and the liquid separated from the gas. The pressure is released on the liquid which releases a further amount of gas and the liquid is then centrifuged to separate suspended solids.

When operating in this manner without the suspended Luxmass, the disposition of the sulfur in percent is as follows:

| | |
|---|---|
| Sulfur retained in the oil _____percent__ | 60.9 |
| Sulfur removed in gas _____do____ | 7.2 |
| Sulfur released from oil _____do____ | 17.5 |
| Sulfur dissolved in oil _____do____ | 14.4 |
| Solubility constant of $H_2S$ at 1 atm. and 20° C. ___ | 4.4 |

As the amount of Luxmass suspended in the feed is increased, the sulfur content of the product and of the recycle gas decreased until when sufficient Luxmass is used to combine with all of the liberated $H_2S$ the product and recycle gas are substantially sweet.

When using colloidal copper or nickel in place of the Luxmass the results are similar, but the recovery of the metal is more difficult.

I claim as my invention:

1. A process for the hydrodesulfurization of a hydrocarbon oil which comprises suspending in the oil to be desulfurized a finely divided metal compound capable of reacting with hydrogen sulfide under the subsequent hydrogenation conditions, in an amount at least stoichiometrically equivalent to the sulfur in the oil, adding hydrogen and continuously passing the mixture down through a fixed, foraminous bed of a sulfactive hydrogenation catalyst under hydrogenation conditions, and separating suspended finely divided solid containing sulfur from the effluent of said foraminous catalyst bed.

2. A process for the hydrodesulfurization of a hydrocarbon oil which comprises suspending in the oil to be desulfrized a finely divided metal compound capable of reacting with hydrogen sulfide under the subsequent hydrogenation conditions, in an amount at least stoichiometrically equivalent to the sulfur in the oil, adding hydrogen and continuously passing the mixture down through a fixed, foraminous bed of a sulfactive catalyst under hydrogenation conditions and at a pressure sufficiently high that at least 60% of the oil remains in the liquid phase, and separating suspended finely divided solid containing sulfur from the effluent of said foraminous catalyst bed.

3. A process for the hydrodesulfurization of a hydrocarbon oil which comprises suspending in the oil to be desulfurized a finely divided metal oxide capable of reacting with hydrogen sulfide under the subsequent hydrogenation conditions in an amount at least stoichiometrically equivalent to the sulfur in the oil, adding hydrogen and continuously passing the mixture down through a fixed, foraminous bed of a sulfactive catalyst under hydrogenation conditions, separating suspended finely divided sulfided metal oxide from the effluent of said foraminous catalyst bed, reconverting the sulfided metal oxide to the oxide and recycling the same.

4. A process for the hydrodesulfurization of a hydrocarbon oil which comprises suspending in the oil to be desulfurized a finely divided metal capable of reacting with hydrogen sulfide under the subsequent hydrogenation conditions in an amount at least stoichiometrically equivalent to the sulfur in the oil, adding hydrogen and continuously passing the mixture down through a fixed foraminous bed of a sulfactive catalyst under hydrogenation conditions, separating suspended finely divided sulfided metal from the effluent of said foraminous catalyst bed, reconverting the sulfided metal to the metal and recycling the same.

5. A process for the hydrodesulfurization of a hydrocarbon oil which comprises suspending in the oil to be desulfurized a finely divided alkali metal hydride in an amount at least stoichiometrically equivalent to the sulfur in the oil, adding hydrogen, and continuously passing the mixture down through a fixed, foraminous bed of a sulfactive hydrogenation catalyst under hydrogenation conditions, and separating suspended sulfided alkali metal hydride from the effluent of said foraminous bed.

References Cited in the file of this patent

UNITED STATES PATENTS

| | | |
|---|---|---|
| 1,608,339 | Ridge et al. _____ | Nov. 23, 1926 |
| 1,954,843 | Schaad _____ | Apr. 17, 1934 |
| 2,398,919 | Byrns _____ | Apr. 23, 1946 |
| 2,559,457 | Montgomery et al. _____ | July 3, 1951 |
| 2,723,943 | McAfee _____ | Nov. 15, 1955 |